(12) United States Patent
Misra et al.

(10) Patent No.: US 7,008,606 B2
(45) Date of Patent: Mar. 7, 2006

(54) PROCESS FOR PASSIVATING SULFIDIC IRON-CONTAINING ROCK

(75) Inventors: Manoranjan Misra, Reno, NV (US); Rajendra Mehta, Reno, NV (US); Songyuan Chen, Reno, NV (US)

(73) Assignee: The Board of Regents of the University and Community College System of Nevada, Reno, NV (US)

( * ) Notice: Subject to any disclaimer, the term of this patent is extended or adjusted under 35 U.S.C. 154(b) by 59 days.

(21) Appl. No.: 10/192,822

(22) Filed: Jul. 9, 2002

(65) Prior Publication Data

US 2003/0131908 A1 Jul. 17, 2003

Related U.S. Application Data

(60) Provisional application No. 60/304,599, filed on Jul. 10, 2001.

(51) Int. Cl.
*C01F 5/40* (2006.01)
(52) U.S. Cl. .................. 423/554; 75/746; 148/273
(58) Field of Classification Search ............... 148/243, 148/273, 287; 75/746
See application file for complete search history.

(56) References Cited

U.S. PATENT DOCUMENTS

| | | | | |
|---|---|---|---|---|
| 3,941,622 A | * | 3/1976 | Lee et al. ...................... | 148/27 |
| 4,565,549 A | * | 1/1986 | Mathiesen et al. ............ | 44/280 |
| 5,037,479 A | * | 8/1991 | Stanforth ..................... | 106/691 |
| 5,587,001 A | | 12/1996 | De Vries ..................... | 75/743 |
| 5,603,838 A | | 2/1997 | Misra et al. ................. | 210/665 |
| 6,086,847 A | | 7/2000 | Thompson | |
| 6,197,201 B1 | | 3/2001 | Misra et al. ................. | 210/721 |

OTHER PUBLICATIONS

Caruccio, F.T., Geidel, G., Pelletier, M., (1981) "Occurrence and predication of acid drainage". J. of the Energy Division, ASCE, 107(1):167-178.

Doyle, F.M. and Mirza, A.H. (1990) "Understanding the mechanisms and kinetics of pyrite wastes" Proceedings of the Western Regional Symposium on Mining and Mineral Processing pp. 43-51.

Evangelou, V. P., (1998) "Pyrite Chemistry: The Key for Abatement of Acid Mine Drainage" Acidic Mining Lakes: Acid mine Drainage, Limnology and Reclamation Springer-Verlac, pp. 197-222.

Huang, X. and Evangelou, V.P. (1992) Abatement of acid mine drainage by encapsulation of acid producing geological materials, US Bureau of Mines, Contract No. J0309013, pp 1-60 (abstract only).

Kleinmann, R. L. P., (Jul. 1989) "Acid mine drainage: US Bureau of Mines researches and develops control methods for both coal and metal mines" Engineering Mining Journal 161-164.

Marshall, G.P., J.S. Thompson, and R.E. Jenkins, (1998) "New technology for the prevention of acid rock drainage". Proceedings of the Randol Gold and Silver Forum, pp. 203-206.

Sobek, A. A., Schuller, W. A., Freeman, J.R., and Smith, R.M., (1978) Field and laboratory methods applicable to overburden mine soils. EPA 600/2-78-054.

Mehta, et al., Development of a process to prevent acid generation from waste rock and mine tailings, Environmental Issues and Management of Waste in Energy and Mineral Production, Proceedings of the International Conference on Environmental Issues and Mineral Production, 6$^{th}$, Calgary, AB, Canada, May 30-Jun. 2, 2000, pp. 577-580.

\* cited by examiner

*Primary Examiner*—George Wyszomierski
(74) *Attorney, Agent, or Firm*—Greenlee, Winner and Sullivan, P.C.

(57) ABSTRACT

A method is provided for passivating sulfidic iron-containing rock comprising contacting sulfidic iron-containing rock with one or more members of the group consisting of magnesium oxide, magnesium hydroxide, magnesium chloride, magnesium nitrate and magnesium carbonate, thereby reducing the acid generation potential of rock.

6 Claims, 1 Drawing Sheet

PROCESS FOR PASSIVATING SULFIDIC IRON-CONTAINING ROCK

CROSS-REFERENCE TO RELATED APPLICATIONS

This application claims priority to U.S. provisional application Ser. No. 60/304,599, filed Jul. 10, 2001, which is hereby incorporated by reference in its entirety to the extent not inconsistent with the disclosure herewith.

BACKGROUND OF THE INVENTION

This invention is in the field of reducing or eliminating acid rock drainage from sulfidic iron containing rocks and acidic mine waste tailings. Acid rock drainage (formation of sulfuric acid and related acids from natural air/water oxidation processes on various materials) is a common phenomenon from mining and leaching of various metallic and non-metallic minerals such as iron-containing sulfidic materials. These sulfidic materials include tailings, overburden, discarded waste rock and unmined exposed rock. Acid rock drainage causes severe pollution problems throughout the world.

There have been various attempts to render these sulfidic materials non-reactive which include partially converting pyrite and pyrrhotite into an oxide structure so that each iron sulfide particle is coated with an iron oxide film, microencapsulation of pyrite by artificial inducement of iron phosphate coatings, the coating of exposed surfaces with various polymeric materials, and the formation of manganese dioxide coatings on pyrite surfaces. These methods of treating materials have been at best partially effective and economically unattractive.

U.S. Pat. No. 5,587,001 (DeVries, Dec. 24, 1996) describes a method for reducing acid rock drainage from sulfidic iron-containing rock by contacting the rock with an aqueous solution of manganate ion at a pH between 6–13. This treatment reportedly creates a manganese oxide layer on the iron-containing sulfidic rock. The process in the U.S. Pat. No. 5,587,001 requires pH 6–13 at all times during the treatment, preferably a pH greater than 10. U.S. Pat. No. 5,587,001 also requires that permanganata color be maintained during the treatment. This condition often requires high dosage of manganate ions for treating reactive tailings because a considerable amount of manganate ions are dissolved in solution and react with other ions before reaching the sulfide surface. U.S. Pat. No. 5,587,001 also requires that the sulfides contain a significant concentration of iron bearing minerals so that the reaction between iron bearing sulfides and permanganate ions can be sustained. Several dissolved metals undergo precipitation reactions at pH>12. Precipitated metal hydoxycomplexes coat the sulfides, thus preventing the desired electrochemical reaction.

U.S. Pat. No. 6,086,847 (Thompson, Jul. 11, 2000) discloses a process for reportedly preventing acid rock drainage of metal-bearing rocks comprising contacting a sulfidic iron-containing rock with an acid passivating agent which comprises at least one alkaline earth metal to produce a combination; contacting the combination with manganate ions and a base and maintaining the pH of the system between 11 and 13.5.

The waste rock naturally yields very low acidic pH in the range of 1–4. To raise the pH and maintain it at a higher level than is naturally found (such as the pH required by the process disclosed in U.S. Pat. Nos. 5,587,001 and 6,086, 847) requires high dosage of neutralization agents (for example, lime/caustic soda). This is not economically and technically viable. Also, at high pH (above about 11.0), gypsum ($CaSO_4$) and $MgSO_4$ precipitate on the sulfide and complete coating of desired materials cannot be achieved. Improved and cost effective treatments are necessary to treat iron containing sulfidic minerals to prevent or minimize the natural oxidation of these materials to form acids.

SUMMARY OF THE INVENTION

A method for passivating sulfidic iron-containing rock and mine wastes is provided. This method is useful to reduce the amount of acid rock drainage from mine waste tailings and other areas where formation of acid products is a problem, among other uses. The process disclosed herein is independent of the concentration of iron sulfide in the materials to be treated and the physical state of materials. Also, the low pH treatment ensures that the sulfide surfaces are exposed and are in direct contact with the layers of coating agents.

The tailings, waste rock and other exposed surfaces at mining operations can react with atmospheric air and surface water over a period of time forming polluting acid drainage. Formation of magnesium oxysulfate coatings on iron-containing sulfides shield them from atmospheric air or surface water containing oxygen to prevent or minimize acid drainage problems.

As used herein, "passivating" means rendering the substance passivated less reactive than it was before passivation. For example, a passivated sulfidic iron-containing ore is an ore that generates no acid or less acid than a non-passivated ore upon being exposed to acid-generating and/or weathering processes. An "effective amount" is an amount that given the desired effect, as taught herein.

In one embodiment, the process of this invention for passivating sulfidic iron-containing rock comprises the steps of:

contacting said rock with a magnesium-containing substance; if necessary, adjusting the pH of the slurry so that magnesium oxysulfate is formed; optionally adding silicates, for example, sodium or calcium silicates; optionally allowing oxidation of the rock to form oxysulfates on a surface of the rock; and optionally adding an iron-containing substance, for example $FeCl_3$ or $Fe_2(SO_4)_3$ to form ferrous iron-magnesium sulfates.

The magnesium-containing substance used can be any suitable composition such as one or more members of the group consisting of magnesium oxide, magnesium hydroxide, magnesium chloride, magnesium nitrate and magnesium carbonate. In addition, any suitable form can be used. For example, an aqueous saturated solution may be used, or dry solid may be used. The use of magnesium hydroxide prevents reaching of overdose level of alkali. An overdose level of alkali is the concentration that blocks solution passage and permeability. The use of MgO maintains the pH at near 9 and below. Preferably, the magnesium-containing substance is in the form of an aqueous saturated solution of magnesium oxide or dry magnesium oxide (about 2.2–22.0 lbs MgO/ton of rock which is about 0.1–1% magnesium oxide by weight in the solution) or magnesium hydroxide (preferably 2.5% by weight of solution magnesium hydroxide).

Preferably, the rock and magnesium are reacted in the form of a slurry. The rock can be directly treated in the natural environment or as crushed rock preferably containing about 20%–50% by weight of solids, but any concentration or range of concentrations which allows the desired reaction to occur at a desired rate is included in this description. When magnesium oxide is used, the weight ratio of magnesium oxide: rock: water is preferably maintained at up to 1:100:400–10:100:400.

The pH of the rock slurry is usually between about 1 and 5 as it naturally occurs. It is generally not necessary to adjust the pH of the slurry before treatment. If the pH of the starting system is greater than about 4–5, pH adjustment is needed using any suitable pH adjustment treatment, as described further herein and as is known in the art without undue experimentation.

After the magnesium-containing substance is contacted with the rock for a time sufficient to form magnesium sulfate as determined by means known in the art, the pH is raised by any means known in the art (preferably calcium oxide or sodium hydroxide are added) to causes the formation of magnesium oxysulfate (preferably the pH is raised to 9–11 for the formation of magnesium oxysulfate). At this point, the reactive sulfide in the rock is stabilized. Optional oxidation of the slurry, preferably with air, but any oxidizing agent may be used, results in the formation of different phases of oxysulfates on the surfaces of the sulfides. If desired, an effective amount (for example, 1–5 lb/ton rock) of silicate (for example, sodium silicate or calcium silicate) added at any stage of the process increases the strength of the coating due to formation of magnesium sulfate and magnesium silicate compounds. Any amount of silicate that causes formation of magnesium sulfate or magnesium silicate can be used. If desired, an iron-containing substance such as an iron salt may be added in a suitable concentration to form ferrous iron-magnesium sulfates. The iron salt may be any suitable salt known to one of ordinary skill in the art, including $FeCl_3$. The concentration of iron-containing substance added is any concentration sufficient to form the desired amount of ferrous iron-magnesium sulfate. If there is a low concentration of dissolved iron, enough iron must be added to form the complex. This is typically 1–2 lb/ton of ore.

A presently-preferred embodiment of the process is the method of reducing acid rock drainage from sulfidic iron-containing rock comprising the steps of contacting said rock with dry/hydrated magnesium oxide wherein the concentration of magnesium oxide in the mixture is 0.1–1% by weight and the slurry density is about 20% by weight of solids in the mixture, and the pH of the resultant slurry is between 1–5; allowing a reaction between magnesium oxide and the sulfides in said rock to proceed so as to form in slurry dissolved magnesium sulfate; raising the pH of the slurry to form magnesium oxysulfate (preferably by the addition of CaO or sodium hydroxide, and preferably to about 10–10.5); optionally adding silicates of sodium or calcium; optionally performing air oxidation of slurry so as to cause the formation of magnesium oxysulfates coating on the surface of said sulfides.

Another preferred embodiment of the process is a process for reducing acid rock drainage from sulfidic iron-containing rock comprising the steps of:

contacting said rock with an aqueous colloidal suspension of 2.5% magnesium hydroxide; allowing a reaction between magnesium hydroxide and the sulfides in said rock to proceed; raising the pH of the slurry to form magnesium oxysulfate (preferably by the addition of CaO or sodium hydroxide, preferably to about 10–10.5); optionally adding silicates of sodium or calcium; optionally performing air oxidation of slurry; optionally adding $FeCl_3$ or other iron salts.

DETAILED DESCRIPTION OF THE INVENTION

Figure 1:
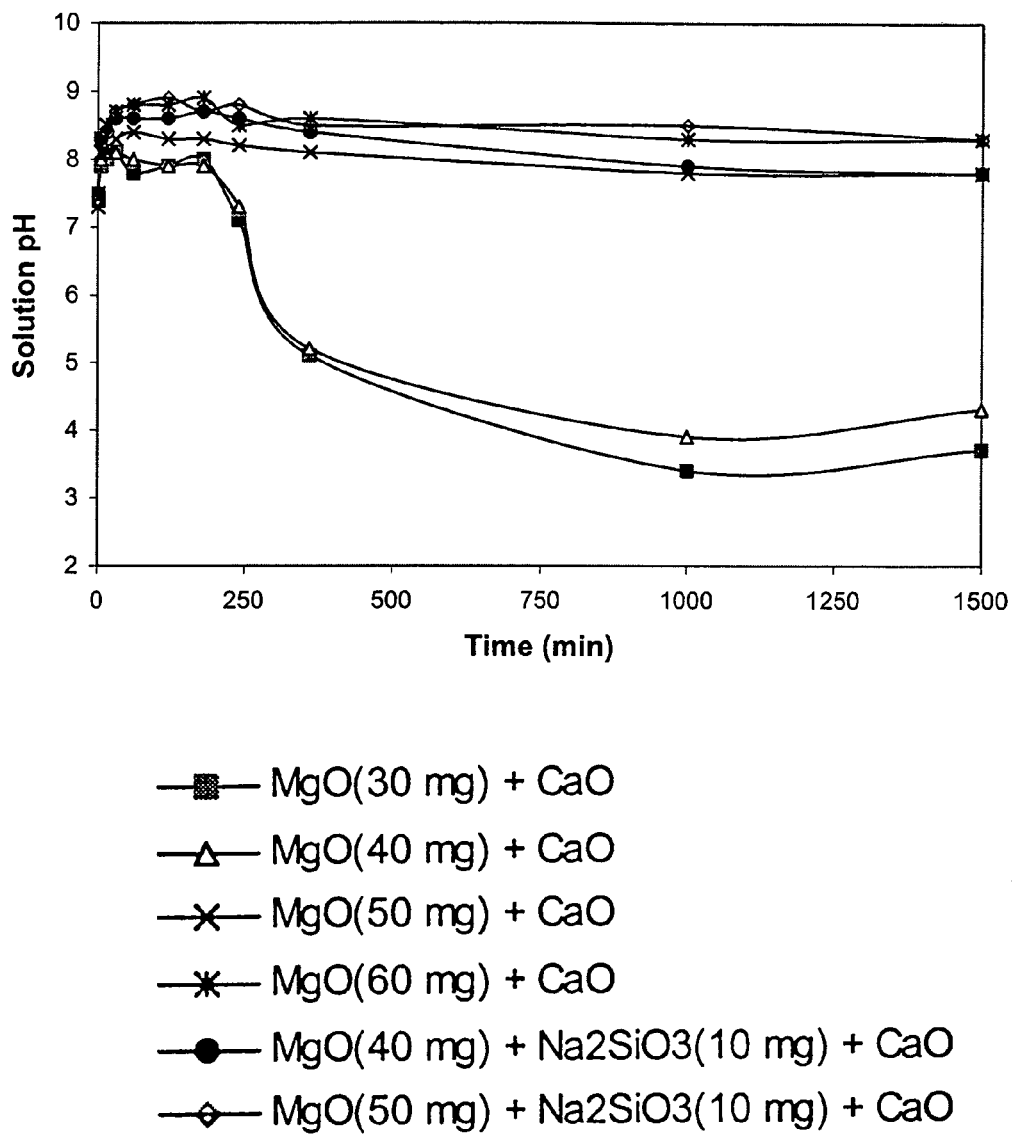
FIG. 1 shows solution pH of pyrite sample in the hydrogen peroxide test as a function of time after passivation using MgO and silicate.

The ores that may be treated using the method of the invention include pyrrhotite, bornite, chalcopyrite, arsenopyrite and pyrite. Any ore that contains iron and sulfur in its reduced form (sulfide) may be treated to passivate the sulfur using the disclosed process. The ore may be in any form, for example, slurry, rock pile or exposed rock.

The reaction proceeds for a suitable time required to achieve the desired amount of passivation of the sulfur in the ore. This time naturally depends on the nature of the ore treated, the desired amount of passivation of the sulfur in the rock and other parameters, such as concentration of reactants used. This time is readily determined by routine experimentation well within the skill of one of ordinary skill in the art without undue experimentation, using the teachings herein.

The processes of this invention can be carried out at temperatures above the freezing point of the solutions up to about 60° C.

Applicant does not wish to be bound by any theory presented herein. The theory and examples below are presented to aid in the understanding of the invention and illustrating some of the presently-preferred embodiments of the invention.

EXAMPLE 1

Effect of Magnesium Oxide Dosage on Passivation in the Presence of Permanganate 5 gms –325 mesh pure pyrite sample was mixed with 20 mg of lime to increase the pH to basic pH (about 10.5). In place of lime, caustic soda or sodium carbonate or other suitable materials that increase the pH to the desired range may be added. Different dosage levels of magnesium oxide were used (0, 2.2 lbs magnesium oxide/ton rock, 4.4 lbs./t, 8.8 lbs./t, 13.2 lbs./t and 22.0 lbs./t). 20 ml. of tap water was added to the mixture of pyrite, lime and magnesium oxide and the slurry pH were measured to be about 1.5. The slurry pH was then raised to 10–10.3 by the addition of 1 N NaOH. At this point, 1.32 lbs./t of permanganate was added. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1-day duration, the tests which showed pH of above 7, were considered to be successful tests in-terms of passivation. If the pH drops below 7 much before 24 hours, the test is also considered a fail. The results are presented in Table 1 below.

TABLE 1

Peroxide Tests Results with different dosage of MgO. The $KMnO_4$ dosage was maintained constant in each test (1.32 lbs./T)

| MgO Dosage (lbs./t) | Peroxide Test Result | Remarks |
|---|---|---|
| 0 | Failed | Vigorous reaction, fails at 60 minutes |
| 2.2 | Failed | Vigorous reaction, fails at 60 minutes |

TABLE 1-continued

Peroxide Tests Results with different dosage of MgO. The KMnO$_4$ dosage was maintained constant in each test (1.32 lbs./T)

| MgO Dosage (lbs./t) | Peroxide Test Result | Remarks |
| --- | --- | --- |
| 4.4 | Failed | Vigorous reaction, fails at 60 minutes |
| 8.8 | Failed | Slow reaction, fails after 1 day |
| 13.2 | Failed | Slow reaction, fails after 1 day |
| 22.0 | Passed | Slow reaction, pH above 7.8 |

These results show that at lower dosages of MgO, passivation was not effective due to enormous surface area of pyrite involved. However, when the dosage was increased to 22 lbs./t level, the pyrite was successfully passivated. Considering the fact that in mine tailings sample, the pyrite present is fraction of the total sample, the dosage level of MgO required to passivate an actual sample will be at considerably lesser dosage level than 22 lbs./t.

These results show that in order to passivate the same pyrite sample, MgO dosage level of 22 lbs./t was required. Note that in these experiments, permanganate dosage level of 1.37 lbs./t was present. Since permanganate is beneficial in passivating the pyrite sample (as indicated in U.S. Pat. No. 5,587,001), it was not clear as to what extent MgO was responsible for the passivation.

EXAMPLE 2

Effect of Potassium Permanganate Dosage on Passivation in the Presence of MgO 5 gms −325 mesh pure pyrite sample was mixed with 10 mg of MgO and 20 mg of lime. This amounts to 4.4 lbs./t of MgO and 8.8 lbs./t of CaO. 20 ml. of tap water was added to the mixture of pyrite, lime and magnesium oxide and the slurry pH were measured to be about 1.5. The slurry pH was then raised to 10–10.3 by the addition of 1 N NaOH. At this point, different dosage of permanganate (0, 1.32 lbs./t, 2.64 lbs./t, 5.28 lbs./t, 10.56 lbs./t, 21.12 lbs./t) was added. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1-day duration, the tests which showed pH of above 7, were considered to be successful tests in-terms of passivation. The results are presented below in Table 2.

TABLE 2

Peroxide Tests Results with different dosage of KMnO$_4$. The MgO dosage was maintained constant in each test (4.4 lbs./T)

| KMnO$_4$ Dosage (lbs./t) | Peroxide Test Result | Remarks |
| --- | --- | --- |
| 0 | Failed | Vigorous reaction, fails at 60 minutes |
| 1.32 | Failed | Vigorous reaction, fails at 60 minutes |
| 2.64 | Failed | Vigorous reaction, fails at 60 minutes |
| 5.28 | Failed | Vigorous reaction, fails at 60 minutes |
| 10.56 | Failed | Vigorous reaction, fails after 1 day |
| 21.12 | Passed | Slow reaction, pH above 9 |

These results show that in order to passivate the same pyrite sample, permanganate dosage level of 21.12 was required. Please note that in these experiments, MgO dosage level of 4.4 lbs./t was present. Since MgO is beneficial in passivating the pyrite sample, it was not clear as to what extent permanganate was responsible for the passivation.

EXAMPLE 3

Effect of Magnesium Oxide Dosage on Passivation in the Absence of Permanganate 5 gms −325 mesh pure pyrite sample was used. Different dosage levels of magnesium oxide were used (11.0 lbs./t, 15.4 lbs./t, 19.8 lbs./t, and 22.0 lbs./t). 20 ml. of tap water was added to the mixture of pyrite and magnesium oxide. The slurry pH was measured to be about 1.3. The slurry pH was then raised to 10–10.3 by the addition of 1 N NaOH. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1-day duration, the tests which showed pH of above 7, were considered to be successful tests in-terms of passivation. The results are presented in Table 3 below.

TABLE 3

Peroxide Tests Results with different dosage of MgO in the absence of KMnO$_4$.

| MgO Dosage (lbs./t) | Peroxide Test Result | Remarks |
| --- | --- | --- |
| 11.0 | Failed | Vigorous reaction, fails at 60 minutes |
| 15.4 | Failed | Vigorous reaction, fails at 60 minutes |
| 19.8 | Failed | Vigorous reaction, fails at 60 minutes |
| 22.0 | Passed | Slow reaction, pH above 7.5 |

Comparing the results of Table 1 and Table 3, it is clear that the presence of permanganate does not favorably affect the passivation process. To passivate the pyrite sample, 22.0 lbs./t of MgO was needed regardless of the presence of permanganate in the solution.

EXAMPLE 4

Effect of Potassium Permanganate Dosage on Passivation in the Absence of MgO 5 gms −325 mesh pure pyrite sample was used. 20 ml. of tap water was added to the pyrite and the slurry pH was measured to be about 1.3. The slurry pH was then raised to about 8 by the addition of 1 N NaOH. At this point, different dosage of permanganate (6.6 lbs./t, 11.0 lbs./t, 13.2lbs/t, 15.4lbs./t and 22.0 lbs./t) was added. The final pH was adjusted to be 10–10.3. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1-day duration, the tests which showed pH of above 7, were considered to be successful tests in-terms of passivation. The results are presented below in Table 4.

Comparing the results of Table 2 and Table 4, it is clear that permanganate dosage level about 15.4 lbs./t is needed in the absence of MgO to passivate the pyrite.

TABLE 4

Peroxide Tests Results with different dosage
of KMnO$_4$ in the absence of MgO

| KMnO$_4$ Dosage (lbs./t) | Peroxide Test Result | Remarks |
|---|---|---|
| 6.6 | Failed | Vigorous reaction, fails at 60 minutes |
| 11.0 | Failed | Vigorous reaction, fails at 60 minutes |
| 13.2 | Failed | Vigorous reaction, fails at 60 minutes |
| 15.4 | Passed | Slow reaction, pH above 7 |
| 22.0 | Passed | Slow reaction, pH above 7 |

The results listed in Table 1–4 show that the passivation is favorably affected by increasing the dosage level of permanganate and MgO. On a tonnage basis, even though little higher dosage of MgO is required than permanganate, however, considering the enormous price difference between permanganate and MgO (Permanganate $1.50/lb, MgO 50 cents/lb), it is economical to use MgO in place of permanganate.

EXAMPLE 5

Effect of Lime Dosage on Passivation in the Absence of MgO 5 gms –325 mesh pure pyrite sample was mixed with 100 mg of lime (44.0 lbs./t). 20 ml. of tap water was added to the mixture of pyrite and lime and the slurry pH were measured to be about 4.5. The slurry pH was then raised to 10–10.3 by the addition of 1 N NaOH. At this point, 1.32 lbs./t of permanganate was added. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1-day duration, the tests which showed pH of above 7, were considered to be successful tests in-terms of passivation. The results are presented in Table 5 below.

TABLE 5

Peroxide Tests Results with High dosage
of CaO in the absence of MgO
The KMnO$_4$ dosage was maintained (1.32 lbs./T).

| CaO Dosage (lbs./t) | Peroxide Test Result | Remarks |
|---|---|---|
| 44.0 | Failed | Vigorous reaction, fails at 60 minutes |

As expected even at very high dosage of CaO, the passivation did not occur.

EXAMPLE 6

Effect of Addition of Magnesium Oxide at Higher pH (5.0) on Passivation in the Absence of Permanganate 5 gms –325 mesh pure pyrite sample was mixed with 20 mg of CaO. 20 ml. of tap water was added to the mixture of pyrite and lime. The slurry pH was then raised to 5 by the addition of 1 N NaOH. At pH 5.0, 22 lbs./t of MgO was added. The pH was then raised to 10–10.3. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1 day duration, the tests which show pH greater than 7 were considered successful in terms of passivation. The results are presented in Table 6 below.

TABLE 6

Peroxide Tests Results with MgO added at
pH 5.0 in the absence of KMnO$_4$.

| MgO Dosage (lbs./t) | Peroxide Test Result | Remarks |
|---|---|---|
| 22.0 | Passed | Slow reaction, pH above 7.5 |

Comparing the results of Table 3 and Table 6 it is clear that the addition of MgO whether added at pH 1.7 or at pH 5.7 does not make any difference.

EXAMPLE 7

Effect of the Addition of Hydrated Magnesium Oxide on Passivation 5 gms –325 mesh pure pyrite sample was mixed with 20 mg of CaO. 20 ml. of tap water was added to the 50 mg of MgO, which resulted in the pH of 10.3. This hydrated MgO slurry was added to the mixture of pyrite and lime. The slurry pH was then raised to 10–10.3 by the addition of 1 N NaOH and 1.32 lbs./t KMnO$_4$ was added. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1 day duration, the tests which showed pH of above 7 were considered to be successful tests in-terms of passivation. The results are presented in Table 7 below.

TABLE 7

Peroxide Tests Results with the MgO addition in Hydrated Form

| MgO Dosage (lbs./t) | Peroxide Test Result | Remarks |
|---|---|---|
| 22.0 | Passed | Slow reaction, pH above 7.5 |

Comparing the results of Table 3, Table 6 and Table 7 it is clear that the pH and the form of MgO does not affect the passivation process.

EXAMPLE 8

MgO as Limiting Factor in the Passivation Process 5 gms –325 mesh pure pyrite sample was mixed with 50 mg (22.0 lbs./t) of MgO and 20 mg of CaO. 20 ml. of tap water was added to the mixture of pyrite, lime and magnesium oxide and the slurry pH were measured to be about 1.65. The slurry was subjected to different treatments, such as pH adjustment to 10.0 and 12.0 followed by with and without aeration, KMnO$_4$ addition at pH 10.0 and 12.0 followed by with and without aeration, KMnO$_4$ addition at low pH followed by with and without aeration at pH 10.0. For the tests where there was no aeration, the slurry was left undisturbed for 2 hours. The slurry was then filtered and the solids were washed. The washed solids were suspended in 91 ml. of water and to this 9 ml. of 50% hydrogen peroxide was added. The pH of the solution was monitored for 2 days. The tests which showed pH of above 7, were considered to be successful tests in-terms of passivation. The test conditions and results are presented in Table 8 below.

TABLE 8

Peroxide Tests Results with different conditions
in the presence of 22.0 lbs./t of MgO

| Conditions | Peroxide Test Result | pH measured after 2 days |
|---|---|---|
| Adjusted to pH 10.0 | Passed | Final pH 7.62 |
| Adjusted to pH 12.0 | Passed | Final pH 8.08 |
| Adjusted to pH 10, 2 hours of Aeration | Passed | Final pH 7.65 |
| Adjusted to pH 10 + added 1.37 lbs./t of permanganate | Passed | Final pH 7.82 |
| Adjusted to pH 10 + added 1.37 lbs./t of permanganate, 2 hours of aeration | Passed | Final pH 7.65 |
| Adjusted to pH 12 + 1.37 lbs./t of permanganate | Passed | Final pH 8.05 |
| Added 1.37 lbs./t of permanganate at pH 1.7, Increase pH to 10 | Passed | Final pH 7.59 |
| Added 1.37 lbs./t of permanganate at pH 1.7 Increase pH to 10, 2 hours of aeration | Passed | Final pH 7.58 |
| Added 1.37 lbs./t of permanganate at pH 5.7, Increase pH to 10, 2 hours of aeration | Passed | Final pH 7.85 |

The results listed in Table 8 clearly show that the addition of MgO is a limiting factor in the passivation process. As long as the 22-lbs./t-dosage level of MgO was met in the experiment, the passivation is successfully achieved in all the tests. However, the pH monitoring data shows that the aeration is beneficial during the passivation treatment and brings down the dosage level of MgO required to achieve the passivation.

EXAMPLE 9

Effect of Magnesium Oxide Dosage on Passivation for Hecla Tailing Sample 5 gms of as-received dry Hecla tailings sample was mixed with 20 mg of CaO and different dosage levels of magnesium oxide (0, 2.2 lbs./t, 4.4 lbs./t, 8.8 lbs./t). 20 ml. of tap water was added to the mixture of pyrite, lime and magnesium oxide. Hecla is a mine in Idaho. The slurry pH was measured to be about 12.02, 12.28, 12.3 and 12.4 respectively. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1-day duration, the tests which showed pH of above 7, were considered to be successful tests in-terms of passivation. The results are presented in Table 9 below.

TABLE 9

Peroxide Tests Results for the Hecla
Tailings Sample with Different Dosage of MgO.

| MgO Dosage (lbs./T) | Peroxide Test Result | Final pH after 1 day |
|---|---|---|
| 0 | Failed | 4.3 |
| 2.2 | Passed | 7.28 |
| 4.4 | Passed | 8.03 |
| 8.8 | Passed | 8.20 |

The data in Table 9 shows that much lower dosage of MgO (<2.2 lbs./t) was required as opposed to 22 lbs./t in the case of pyrite.

EXAMPLE 10

Effect of Magnesium Oxide Dosage on Passivation for Nevada Mine Tailings Sample 5 gms of as-received dry mine tailings sample from a mine in Nevada was mixed with 20 mg of CaO and different dosage levels of magnesium oxide (0, 2.2 lbs./t, 4.4 lbs./t, 8.8 lbs./t, 13.20 lbs./t, 17.60 lbs./t). 20 ml. of tap water was added to the mixture of pyrite, lime and magnesium oxide. The slurry pH was adjusted to 10.0 with 1 N NaOH. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1-day duration, the tests which showed pH of above 7, were considered to be successful tests in-terms of passivation. The results are presented in Table 10 below.

TABLE 10

Peroxide Tests Results for Mine Tailings
Sample with Different Dosage of MgO.

| MgO Dosage (lbs./T) | Peroxide Test Result | Remarks |
|---|---|---|
| 0 | Failed | pH 2.54 after 3 hours |
| 2.2 | Failed | pH 2.57 after 3 hours |
| 4.4 | Failed | pH 2.59 after 3 hours |
| 8.8 | Failed | pH 3.58 after 3 hours |
| 13.20 | Passed | Final pH after 1 day 7.22 |
| 17.60 | Passed | Final pH after 1 day 7.42 |

The data in Table 10 shows that much lower dosage of MgO (<13.2 lbs./t) was required as compared to 22 lbs./t in the case of pyrite.

EXAMPLE 11

Effect of Magnesium Oxide Dosage on Passivation for Ruby Gulch Tailings Sample 5 gms of as-received dry Ruby Gulch tailings sample was mixed with 20 mg of CaO and different dosage levels of magnesium oxide (0, 2.2 lbs./t, 4.4 lbs./t, 8.8 lbs./t, 13.20 lbs./t). 20 ml. of tap water was added to the mixture of pyrite, lime and magnesium oxide. Ruby Gulch is a mining site in South Dakota. The slurry pH was adjusted to 10.0 with 1 N NaOH. The slurry was left undisturbed for 2 hours. The slurry was filtered and the solids were washed. The washed solids were suspended in 91 ml. of water and to this 9 ml. of 50% hydrogen peroxide was added. The pH of the solution was monitored for 1 day. At the end of 1-day duration, the tests which showed pH of above 7, were considered to be successful tests in-terms of passivation. The results are presented in Table 11 below.

TABLE 11

Peroxide Tests Results for the Ruby Gulch
Tailings Sample with Different Dosage of MgO.

| MgO Dosage (lbs./T) | Peroxide Test Result | Remarks |
|---|---|---|
| 0 | Failed | pH 3.16 after 3 hours |
| 2.2 | Failed | pH 3.52 after 3 hours |
| 4.4 | Failed | pH 6.34 after 1 day |
| 8.8 | Passed | Final pH after 1 day 7.17 |
| 13.20 | Passed | Final pH after 1 day 7.82 |

The data in Table 11 shows that much lower dosage of MgO (<8.8 lbs./t) was required as opposed to 22 lbs./t in the case of pyrite.

A large column test was performed using magnesium oxide. The pH during passivation was maintained at 10 using MgO only. MgO was added as a passivating agent. After passivation, a sample representing 150 grams of solid was transferred to the humidity cell experiment. The humidity cell experiment was operated on seven-day cycles. In the first three days dry air was passed into the sample, followed by three-day moisturized air treatment. On the seventh day the sample was leached and the leachate was analyzed for pH, alkalinity, acidity, sulfate and other elements. Long-term testing with Ruby Gulch tailings affirmed the effectiveness of the process, as shown in Table 12.

In the table below, each cycle is for the same sample and is reported as the function number of cycles.

EXAMPLE 12

Combined Effect of Sodium Silicate with MgO

In another series of experiments the combined effect of MgO with silicate was tested. The pH of the pyrite sample was increased to 10.5 with CaO and a small amount of sodium silicate was added prior to MgO addition. After reaction, the sample was filtered and $H_2O_2$ test was conducted as described above. The results are shown in Table 13.

TABLE 13

Peroxide Tests Results for the Pyrite Sample
with Different Dosage of MgO and Sodium Silicate.

| MgO Dosage (lbs./T) | Sodium Silicate Dosage (lbs./T) | Peroxide Test Result | Remarks |
|---|---|---|---|
| 13.2 | 0 | Failed | pH 3.70 after 3 hours |
| 17.6 | 0 | Failed | pH 4.30 after 3 hours |
| 22.0 | 0 | Passed | Final pH after 1 day 7.80 |
| 26.4 | 0 | Passed | Final pH after 1 day 8.30 |
| 17.6 | 4.4 | Passed | Final pH after 1 day 7.81 |
| 22.0 | 4.4 | Passed | Final pH after 1 day 8.30 |

As can be seen in Table 13, with addition of only 17.6 lbs./t MgO, pyrite was not passivated. However, addition of 4.4 lbs./t sodium silicate in the presence of 17.6 lb/ton MgO increased the stability and the pH remained about 7.81. It is evident that sodium silicate improves the passivation.

The effect of silicate addition is also demonstrated in FIG. 1. As can be seen, passivated pyrite samples with MgO and

TABLE 12

Analysis of leachates obtained from humidity cell experiments
(Column test, Ruby Gulch - Waste Dump Sample, High Sulfide)

Sample weight: 4000 g
Dosage: 7.7 lbs./t Magnesium Oxide

| Sample Constituents | CYCLE-1 (mg/l) | CYCLE-2 (mg/l) | CYCLE-3 (mg/l) | CYCLE-4 (mg/l) | CYCLE-5 (mg/l) | CYCLE-6 (mg/l) |
|---|---|---|---|---|---|---|
| PH | 7.63 | 8.05 | 7.61 | 8.31 | 8.32 | 8.09 |
| Conductivity ($\mu v$/cm) | 920 | 890 | 460 | 370 | 225 | 220 |
| Acidity as $CaCO_3$ | 0 | <15 | <15 | <15 | <15 | <15 |
| Alkalinity as $CaCO_3$ | 44 | 30 | 40 | 25 | 45 | 30 |
| Calcium | 19.8 | 18.9 | 16.9 | 13.8 | 11.1 | 11.4 |
| Iron | 0.028 | 0.051 | 0.030 | <0.020 | <0.020 | 0.020 |
| Magnesium | 127 | 104 | 42.7 | 32.6 | 14.2 | 13.6 |
| Manganese | 0.036 | <0.010 | <0.010 | <0.010 | <0.010 | <0.010 |
| Sulfate | 492 | 139 | 95.6 | 28.4 | 26.3 | 27.8 |
| TDS | 700 | 560 | 235 | 238 | 175 | <50 |
| Antimony | <0.003 | <0.006 | 0.006 | <0.006 | <0.006 | <0.006 |
| Barium | <0.050 | 0.061 | 0.064 | 0.080 | 0.075 | 0.075 |
| Beryllium | <0.002 | <0.002 | <0.002 | <0.002 | <0.002 | <0.002 |
| Cadmium | <0.002 | <0.003 | <0.003 | <0.003 | <0.003 | <0.003 |
| Chromium | <0.010 | <0.010 | <0.010 | <0.010 | <0.010 | <0.010 |
| Cobalt | <0.025 | <0.025 | <0.025 | <0.025 | <0.025 | <0.025 |
| Copper | <0.010 | <0.010 | <0.010 | <0.010 | <0.010 | <0.010 |
| Lead | <0.007 | <0.007 | <0.007 | <0.007 | <0.007 | <0.007 |
| Mercury | <0.001 | <0.001 | <0.001 | <0.001 | <0.001 | <0.001 |
| Molybdenum | <0.050 | <0.050 | <0.050 | <0.050 | <0.050 | <0.050 |
| Nickel | <0.025 | <0.025 | <0.025 | <0.025 | <0.025 | <0.025 |
| Selenium | <0.007 | <0.007 | <0.007 | <0.007 | <0.007 | <0.007 |
| Silver | <0.035 | <0.035 | <0.035 | <0.035 | <0.035 | <0.035 |
| Thallium | <0.001 | <0.001 | <0.001 | <0.001 | <0.001 | <0.001 |
| Vanadium | <0.100 | <0.100 | <0.100 | <0.100 | <0.100 | <0.100 |
| Zinc | <0.050 | <0.050 | <0.050 | <0.050 | <0.050 | <0.050 | silicate in the presence of lime showed improved resistance to peroxide oxidation as compared to samples with no silicate.

Combined Effect of Calcium Silicate with MgO

In another series of experiments the combined effect of MgO with calcium silicate was tested. The pH of the pyrite sample was increased to 10.5 with CaO and a small amount of calcium silicate was added prior to MgO addition. After reaction, the sample was filtered and an $H_2O_2$ test was conducted as above. The results are given in Table 14.

TABLE 14

Peroxide Test Results for the Pyrite Sample with Different Dosage of MgO and Calcium Silicate.

| (MgO Dosage, lb/T) | Calcium Silicate (lb/T) | Peroxide Test Result | Remarks |
|---|---|---|---|
| 13.2 | 0 | Failed | pH 3.7 after 3 hrs |
| 17.6 | 0 | Failed | pH 3.78 after 24 hrs |
| 17.6 | 4.4 | Passed | pH 7.6 after 24 hours |

As can be seen from Table 14, 4.4 lb/ton addition of calcium silicate increased the passivation of pyrite. This shows that calcium silicate can be used in conjunction with CaO to passivate pyrite at pH 10.5.

REFERENCES

1. Caruccio, F. T., Geidel, G., Pelletier, M., "Occurrence and predication of acid drainage". *J. of the Energy Division, ASCE,* 107, No. 1, pp.167, 1981.
2. De Vries, Nadine H. C. Process for Treating Iron-Containing Sulfide Rocks and Ores, U.S. Pat. No. 5,587,001, 1996.
3. Doyle, F. M. and Mirza, A. H., "Understanding the mechanisms and kinetics of pyrite wastes". *Proceedings of* the Western Regional Symposium on *Mining and Mineral Processing*, Doyle, F. M. (eds.), Society of Mining Engineering. 1990.
4. Evangelou, V. P., "Pyrite Chemistry: The Key for Abatement of Acid Mine Drainage". *Acidic Mining Lakes: Acid mine Drainage, Limnology and Reclamation* Springer-Verlag, 1998.
5. Huang, X. and Evangelou, V. P., Abatement of acid mine drainage by encapsulation of acid producing geological materials, US Bureau of Mines, Contract No. J0309013, 1992.
6. Kleinmann, R. L. P., "Acid mine drainage: US Bureau of Mines researches and develops control methods for both coal and metal mines". *Enviro. Mining J.,* July, pp161–164, 1989.
7. Marshall, G. P., J. S. Thompson, and R. E. Jenkins, "New technology for the prevention of acid rock drainage". *Proceedings of the Randol Gold and Silver Forum*, pp. 203, 1998.
8. Sobek, A. A., Schuller, W. A., Freeman, J. R., and Smith, R. M., Field and laboratory methods applicable to overburden mine soils. EPA 600/2-78-054, pp203, 1978.

In the disclosed process, as is generally true for other processes, the fewer chemicals used, the more cost effective the process. If desired, other chemicals can be used in the disclosed process, including barium hydroxide and calcium carbonate for pH control, but it is desired that as few chemicals as possible be used to lower the cost of the process.

All numerical ranges given herein include all useful intermediate ranges and values thereof. Useful ranges and values may be determined using the teachings herein and those known in the art without undue experimentation. Useful chemical equivalents may be used for those chemicals specifically exemplified in this disclosure, as known by one of ordinary skill in the art without undue experimentation.

All references cited herein are hereby incorporated by reference to the extent not inconsistent with the disclosure herein. Although the description herein contains many specificities, these are not to be construed as limiting the scope of the invention, but as merely providing illustrations of some of the presently-preferred embodiments of the invention. For example, the magnesium may be in the form of magnesium oxide, or other forms, as known in the art. Thus, the scope of the invention should be determined by the appended claims and their legal equivalents, rather than by the examples given.

We claim:

1. A method of reducing acid rock drainage from sulfidic iron-containing rock comprising the steps of:
   contacting said rock with magnesium oxide wherein the concentration of magnesium oxide in the mixture is 0.1–1% by weight and the slurry density is about 20% by weight of solids in the mixture;
   allowing a reaction between said magnesium oxide and the sulfides in said rock to proceed so as to form in slurry dissolved magnesium sulfate;
   raising the pH of the slurry to about 10–10.5;
   adding silicate to said slurry.
2. The method of claim 1, further comprising contacting said slurry with air.
3. The method of claim 1, further comprising adding an iron-containing substance.
4. A method of reducing acid rock drainage from sulfidic iron-containing rock comprising the steps of:
   contacting said rock with an aqueous colloidal suspension of 2.5% magnesium hydroxide;
   allowing a reaction between said magnesium hydroxide and the sulfides in said rock to proceed so as to form in slurry dissolved magnesium sulfate; raising the pH of the slurry to about 10–10.5;
   adding a silicate to the slurry.
5. The method of claim 4, further comprising contacting said slurry with air.
6. The method of claim 4, further comprising adding an iron-containing substance.

* * * * *